W. A. DOBLE.
HYDRAULIC REGULATING NOZZLE.
APPLICATION FILED JAN. 18, 1910.
1,076,963.
Patented Oct. 28, 1913.
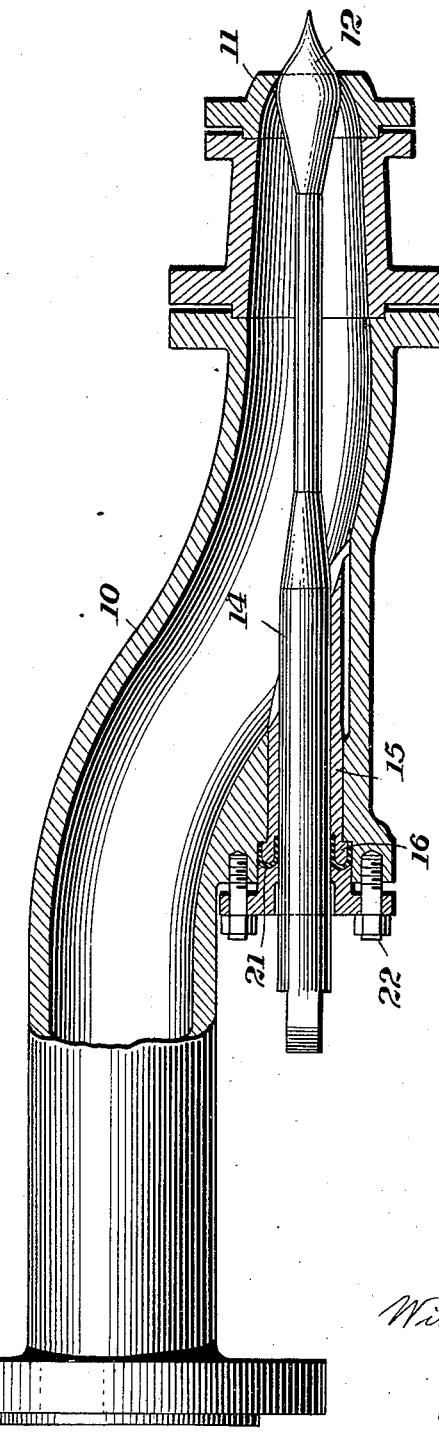
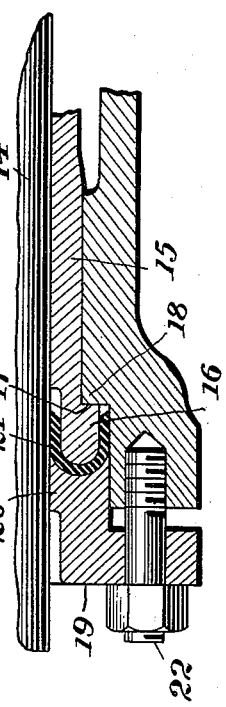
Fig. 1.
Fig. 2.
Witnesses
Inventor
William A. Doble
By
Foster, Freeman,
Watson & Coit
Attorneys

UNITED STATES PATENT OFFICE.

WILLIAM A. DOBLE, OF SAN FRANCISCO, CALIFORNIA, ASSIGNOR TO MAY E. DOBLE, OF SAN FRANCISCO, CALIFORNIA.

HYDRAULIC REGULATING-NOZZLE.

1,076,963.   Specification of Letters Patent.   Patented Oct. 28, 1913.

Application filed January 18, 1910. Serial No. 538,644.

*To all whom it may concern:*

Be it known that I, WILLIAM A. DOBLE, a citizen of the United States, and resident of San Francisco, county of San Francisco, State of California, have invented certain new and useful Improvements in Hydraulic Regulating-Nozzles, of which the following is a specification.

This invention relates to hydraulic regulating nozzles for discharging a varying amount of water for power and other purposes, and is of the type described in my prior Patent No. 660,789, granted October 30, 1900. The nozzle is especially applicable to water wheels.

Nozzles of the type referred to are provided with a core-piece or needle for regulating the discharge, and the stem of the core-piece or needle extends through a renewable bushing constructed of a material, as brass or bronze, that will not corrode. Due to the great amount of wear on these bushings, it is necessary to renew them frequently, and where the entire bushing, including the attaching flange, is of brass or bronze, their replacement becomes very expensive. It has also been difficult to obtain water-tight joints between the bushing and the core-piece, and the bushing and body of the nozzle.

One of the objects of this invention, therefore, is to construct a bushing having the minimum amount of material, and another object is to improve the construction of the joints between the bushing and the core-piece, and the bushing and the body of the nozzle.

The invention will be described in connection with the accompanying drawings, in which—

Figure 1 is an elevation of a nozzle, showing parts thereof in section; Fig. 2 is a detail sectional view of the joint for the core-piece.

The nozzle comprises a body portion 10, provided with a detachable converging tip 11. A movable core-piece or needle is mounted in the nozzle body and comprises a core or head 12 and a stem 14. The stem extends through a renewable bushing 15 detachably mounted in the body. The end 16 of the bushing is provided with an annular stop shoulder 17, coöperating with an annular stop shoulder 18 formed by an enlarged part of the bore for the bushing. A gland 19 is provided with a portion 20, which extends into the enlarged bore and the coöperating faces of the gland and bushing are shaped so as to form an annular cavity U-shaped in cross-section. A cup packing 21 of U-shaped cross-section, and preferably of leather, is located in this cavity and maintained in position by means of the gland 19, the gland being secured to the body by means of a circle of bolts 22.

The U-shaped packing 21 closes the joints between the bushing and the stem of the core-piece and between the bushing and the body, and in this way a single simple packing is provided for closing both joints. The gland 19 will also securely maintain the bushing in position, and by means of this construction the material in the bushing, which is the renewable part, is reduced to a minimum, and the gland may be constructed of any other cheap material, as iron. It will be noted that the U-shaped packing faces in the direction of the interior of the nozzle, therefore, the pressure of the water in the nozzle will act to spread the packing against the stem and the body member closing the joint tightly, and preventing leakage.

The packing has been described as U-shaped in section; it is not necessary that it be of this particular shape, since other forms of packing which will close the joints in the manner described will also be within scope of this invention, for instance, a packing V-shaped in section may be used to advantage.

I have described this invention as applied to the core-piece or needle of a nozzle, and have found it peculiarly applicable in this relation. It is obvious, however, that this invention is applicable to other uses, and, therefore, I do not limit myself to any particular use. It is further obvious that various changes may be made in the details of construction without departing from this invention, and it is, therefore, to be understood that this invention is not to be limited to the specific construction shown and described.

What I claim is:—

1. The combination with a nozzle, of a core-piece for regulating the discharge thereof, a bushing for said core-piece, and a cup shaped packing arranged to close the joints between said core-piece and bushing and between said bushing and the body of the nozzle.

2. The combination with a nozzle, of a core-piece for regulating the discharge thereof, a bushing for said core-piece, and a packing U shaped in section, arranged to close the joints between said core-piece and bushing and between said bushing and the body of the nozzle.

3. The combination with a nozzle, of a core-piece for regulating the discharge thereof, a bushing for said core-piece, a gland coöperating with the end of said bushing, the coöperating faces of said gland and bushing being similarly shaped, and a cup shaped packing between said coöperating faces arranged to close the joints between said core-piece and bushing and between said bushing and the body of the nozzle.

4. The combination with a nozzle of a core-piece for regulating the discharge thereof, a bushing for said core-piece, a gland coöperating with the end of said bushing, the coöperating faces of said gland and bushing being shaped to form a cavity U shaped in section, and a packing U shaped in section located in said cavity and arranged to close the joints between said core-piece and bushing and between said bushing and the body of the nozzle.

5. The combination with a nozzle, of a core-piece for regulating the discharge thereof, a removable bushing for said core-piece provided with a stop shoulder, a coöperating shoulder on the nozzle body, a gland coöperating with said bushing to hold it in place, and a cup shaped packing between the coöperating faces of said gland and bushing arranged to close the joints between said core-piece and bushing and between said bushing and the body of the nozzle.

6. The combination with a body member, of a bushing in said member, a stem in said bushing, a gland coöperating with the end of said bushing, the coöperating faces of said gland and bushing being similarly shaped, and a cup shaped packing between said coöperating faces arranged to close the joints between said stem and bushing and between said bushing and body member.

7. The combination with a body member, of a bushing in said member, a stem in said bushing, a gland coöperating with the end of said bushing, the coöperating faces of said gland and bushing being shaped to form a cavity U shaped in section, and a packing U shaped in section, located in said cavity and arranged to close the joints between said stem and bushing and between said bushing and body member.

8. The combination with a nozzle, of a core-piece for regulating the discharge thereof, a bushing for said core-piece, and a packing, U shaped in section, and facing in the direction of the interior of said nozzle, arranged to close the joints between said core-piece and bushing and between said bushing and the body of the nozzle.

In testimony whereof I affix my signature in presence of two witnesses.

WILLIAM A. DOBLE.

Witnesses:
  FREDERICK GFELLER,
  LEOPOLD M. KARNASCH.

---

Copies of this patent may be obtained for five cents each, by addressing the "Commissioner of Patents, Washington, D. C."